United States Patent [19]

Weinke et al.

[11] 4,195,826

[45] Apr. 1, 1980

[54] ARRANGEMENT FOR A LOW-NOISE AND LOW-SHOCK INTERCEPTION OF MOVING MASSES

[75] Inventors: Robert Weinke, Munich; Georg Wiesmeier, Weidach, both of Fed. Rep. of Germany

[73] Assignee: Siemens Aktiengesellschaft, Berlin & Munich, Fed. Rep. of Germany

[21] Appl. No.: 32,874

[22] Filed: Apr. 24, 1979

Related U.S. Application Data

[63] Continuation of Ser. No. 870,439, Jan. 18, 1978, abandoned.

[30] Foreign Application Priority Data

Jan. 21, 1977 [DE] Fed. Rep. of Germany ....... 2702483

[51] Int. Cl.² .............................................. F16F 3/10
[52] U.S. Cl. ..................... 267/137; 267/33; 267/141; 267/152; 400/686
[58] Field of Search ........... 188/1 B; 267/21 R, 63 R, 267/63 A, 33, 141, 152, 153, 136, 137; 403/221, 225; 340/365 E; 280/716; 400/686, 689

[56] References Cited

U.S. PATENT DOCUMENTS

| | | | |
|---|---|---|---|
| 1,549,453 | 8/1925 | Corcoran | 400/686 X |
| 1,803,125 | 4/1931 | Norin | 400/686 X |
| 1,936,389 | 11/1933 | Hallquist | 267/33 X |
| 2,104,482 | 1/1938 | Helmond | 400/689 X |
| 2,117,433 | 5/1938 | Krebs | 267/33 |
| 2,879,986 | 3/1959 | Maier | 267/152 X |
| 2,962,311 | 11/1960 | Tidd | 280/716 |
| 3,147,964 | 9/1964 | Wolf | 267/63 R |
| 3,385,543 | 5/1968 | Jakel et al. | 267/141 X |
| 3,455,546 | 7/1969 | Shanok et al. | 267/141 |
| 4,032,269 | 6/1977 | Sheth | 267/152 X |

*Primary Examiner*—George E. A. Halvosa
*Attorney, Agent, or Firm*—Hill, Van Santen, Steadman, Chiara & Simpson

[57] ABSTRACT

In the illustrated embodiments, an elastomer body has a relatively thin metal layer overlying the elastomer surface to be loaded so as to prevent adhesion at the elastomer surface in spite of a long period of dwell in contact with a relatively more rigid cooperating part such as a hard rubber stop. In a basic form, a thin metal sleeve may encircle a cylindrical elastomer body. The outer surface of the sleeve may be grooved for extra adhesion resistance. In a further development, the sleeve is formed as a helical wire spring which may be confined between two flanges integral with the elastomer body.

2 Claims, 4 Drawing Figures

ARRANGEMENT FOR A LOW-NOISE AND LOW-SHOCK INTERCEPTION OF MOVING MASSES

This is a continuation of application Ser. No. 870,439, filed Jan. 18, 1978, now abandoned.

BACKGROUND OF THE INVENTION

The subject of the invention is an arrangement for the low-noise and low-shock interception of moving masses employing a damping stop means which is formed from a body consisting of elastomer.

In numerous technical applications it is necessary to intercept a moving mass with a low noise and low shock or to limit a mechanical movement to a given path length or stroke. In precision engineering, damping stop means consisting of elastic material is used to overcome this problem. In practical operation, damping elements may consist of an elastomer, in particular the material known under the trade name "Viton", the chemical name for which is "vinylide fluoride-hexafluorpropylene-copolymerisate" (DIN 47020=ISO/R 1629-1971). This material exhibits good damping under shock load with low shock noise. However, these materials have the disadvantage that after a long period of dwell against the stop means, the detachment of the moving mass is hindered by adhesion at the elastomer surface. The adhesive effect is dependent upon the temperature, the strength of the preceding shock and the bearing force. In precision engineering, for example in a teleprinter or a printer for a data processing installation operating at high switching speeds, even delay times of approximately ten milliseconds (10 msec) are impermissibly long. Furthermore, in the known damping elements, after a long period of operation and under a fluctuating surrounding temperature, an impermissible wear and plastic deformation also occur. In the case of stop means having a decelerating effect, the considerable stray width of (range of variation in) the friction coefficient is also often disturbing, as this gives rise to a very different decelerating and lifting behaviour. The effects of specific lubricants on the known damping elements can further intensify these disadvantageous influences due to chemical changes.

In the known damping stop means, in various applications, the adhesive effect was counteracted by means of increased restoring forces on the moving mass. Furthermore, in order to avoid the above mentioned disadvantages, the operating time and the operating temperature range were limited. An automatic rotation of the damping stop means following a suitable transit time is also already known. A deliberate and limited lubrication has also partially led to an improvement.

SUMMARY OF THE INVENTION

The aim of the invention is to avoid the disadvantages of the known damping stop means without impairing the excellent damping properties.

This aim is realized in accordance with the invention in that on its surface which is to effect the intercepting the body has a metal layer, the thickness of which is substantially less than the thickness of the body.

The new arrangement has the advantage that even in the case of a long period of dwell, the supported mass does not adhere to the surface of the damping stop means. Even with a high surface pressure, no flattening occurs at the contacting surface of the damping stop means as the shape of the contacting surface is maintained by means of the elastic metal layer (elastic because of the elastic body backing). No disturbing wear occurs. The direct contact between the elastomer and the counter stop means is avoided. There is no additional adhesive influence by a chemically or physically changed surface of the elastomer due to lubricants or temperature fluctuations. The friction coefficient straying is considerably reduced. The positive properties regarding noise- and shock-damping are retained in full.

An advantageous further development consists in that the elastomer body is designed to be cylindrical and a metal sleeve is applied to the periphery of the body.

A particularly advantageous further development of the new damping stop means consists in that on its periphery the elastomer body is provided with a wide groove which at its sides is laterally bounded by flanges, and that in the groove at the periphery of the body there is positioned a helical spring, the wire diameter of which is considerably smaller than the wall thickness of the body.

Details of the invention will be explained making reference to advantageous exemplary embodiment which are illustrated in the Figures of the accompanying sheet of drawings; other objects, features and advantages of the invention will be apparent from this detailed disclosure.

DETAILED DESCRIPTION

Figure 1:
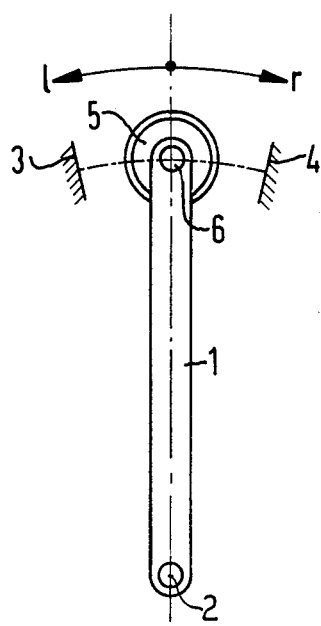
FIG. 1 illustrates a fundamental arrangement for a moving mass and a damping stop means in accordance with the invention.

FIG. 1 shows a fundamental arrangement of a moving mass with a damping stop means. The moving mass is the metal lever 1 which is pivotable about an axis 2. The drive system for moving the lever is not shown in FIG. 1. This can be a mechanical, hydraulic or magnetic drive system. The lever 1 is pivoted in the two arrow directions r and 1 (l). The pivot range is defined by the two stop means 3 and 4. Fundamentally it is possible to design the two stop means 3 and 4 as parallelepiped-shaped, buffer-shaped or cylindrical bodies composed of elastomer and to coat (or cover) these with a metal layer at the loaded surface. The metal lever 1 would then directly strike against the damping stop means which are to serve to limit the movement play.

FIG. 1 illustrates an exemplary embodiment in which the body of the damping element 5 is either fixed or arranged to be rotatable on an axis 6 on the moving lever 1. For example, the element 5 may consist of an elastomer cylinder with a central axial bore at axis 6 for mounting of the cylinder on lever 1, and an annular layer of metal for contacting the stop means 3 and 4. This embodiment has the advantage that only one damping element is required which, when the lever is deflected into the two directions, abuts against the stop means 3 and 4 and limits the movement.

Figure 2:
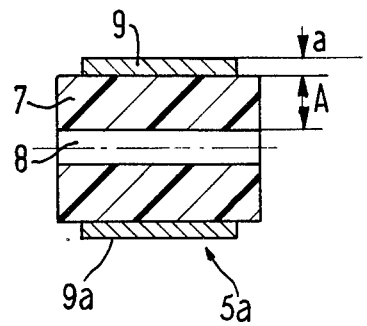
FIG. 2 illustrates a new damping stop means in accordance with the invention detached from its mounting arrangement (which may, for example, correspond to that shown in FIG. 1)

FIG. 2 is an enlarged cross-sectional view of a damping stop means 5a, representing a first embodiment of the damping stop means 5 of FIG. 1. The damping stop means 5a consists of a cylindrical body 7 composed of elastomer which is provided with a bore 8 for receiving a suitable mounting element such as the pin or shaft at axis 6 in FIG. 1. The body 7 can either be firmly screwed in position (or otherwise non-rotatably secured to lever 1, for example) or rotatable on an axis (such as the axis indicated at 6 in FIG. 1, for example). The major part of the periphery is surrounded by a metal sleeve 9. The side elevational view of sleeve 9 and of body 7 conforms with that shown for damping stop means 5 in FIG. 1. The wall thickness a of the metal sleeve 9 is considerably less than the wall thickness A of the cylindrical body 7. The metal sleeve is either pushed, pressed or glued onto the body 7 and solely supported thereby. When stop means 5a is mounted on the lever 1 and the movement of the lever 1 is limited, the cylindrical metal surface 9a of the damping stop means 5a abuts against the lateral counter stop means 3 and 4 (FIG. 1).

Figure 3:
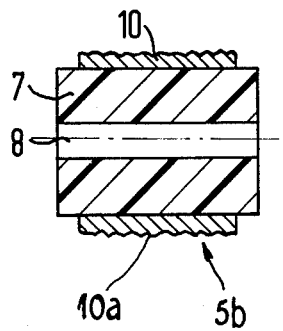
FIG. 3 illustrates an advantageous further development of the new damping stop means.

FIG. 3 illustrates a further development designated by reference numeral 5b of the damping stop means shown in FIG. 2. The difference consists in that the generally cylindrical surface 10a of the metal layer 10 is not flat, but is corrugated or grooved. This further development has the advantage that no adhesive effect occurs on the otherwise flat surface, in particular when oils, fats or other liquids are applied thereto.

Figure 4:
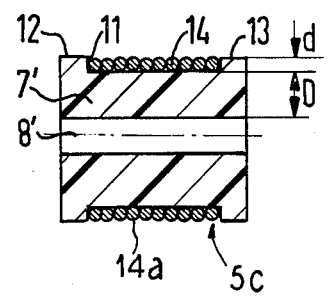
FIG. 4 illustrates a particularly advantageous further development of the new damping stop means.

FIG. 4 illustrates a particularly advantageous further development of the new damping stop means. The damping stop means of FIG. 4 has been assigned reference numeral 5c to indicate that it may be mounted on lever 1 as shown for stop means 5 in FIG. 1. The cylindrical body 7' with the bore 8' is provided at its periphery with a wide groove 11 which is bounded at the two end sides by annular flanges 12 and 13 respectively. A helically wound spring 14 is arranged in the groove 11. The turns of the helical spring are arranged closely next to one another. The diameter d of the spring wire is considerably smaller than the wall thickness D of the body 7'. The wire diameter is to amount to approximately 1/5 or less of the wall thickness D of the body 7'. The known good noise- and damping-properties of elastomers are retained. The design of the damping stop means 5c illustrated in FIG. 4 is particularly advantageous because a particularly cost-favorable production is possible. The helical spring can be produced very cheaply in large numbers. The fixing on the elastomer body in the groove 11 is particularly simple since the helical spring is merely screwed onto one of the two flanges 12 and 13. The two flanges serve to prevent a lateral displacement of the spring 14. This produces a particularly simple component which can be used universally. The damping stop means illustrated in FIG. 4 can also be used as counter stop means, for example in place of the stop means 3 and 4 in FIG. 1. For this purpose the damping stop means is secured by the bore 8' to the wall (which wall would extend parallel to the plane of FIG. 1), with the bore 8' disposed transversely to the direction of movement of the lever 1, or with stop means 5c arranged to be rotatable on a central longitudinal axis of bore 8'. The lever 1 is then intercepted by the generally cylindrical surface 14a of the helical spring 14. On account of the elastic spring 14, the arrangement in FIG. 4 exhibits an even better shock elasticity. In place of the spiral spring, a metal sleeve can also be inserted into the groove 11. This can be effected, for example, by injecting or casting the elastomer body into the metal sleeve.

In each of the embodiments of FIGS. 2, 3 and 4, the thickness (such as a or d) of the metal layer (9, 10 or 14) which contacts the stop means (such as 3 and 4 in FIG. 1) is not greater than about one-fifth the thickness (A or D) of the supporting elastomer of the body (7 or 7').

It will be apparent that many modifications and variations may be effected without departing from the scope of the novel concepts and teachings of the present invention.

We claim as our invention:

1. In a printing instrument or the like, such as a teleprinter or a printer for a data processing installation, in the field of light manufacturing of precision engineered equipment, and wherein a pivotal lever is to be set in motion from a rest condition in engagement with a fixed stop, an arrangement for retaining such lever in the rest condition while minimizing adhesion forces resisting separation from the fixed stop, and yet serving for the low-noise and low-shock interception of the moving lever upon return to such rest condition, said arrangement comprising a damping stop means on one of said lever and fixed stop for engaging a cooperating surface on the other of said lever and fixed stop to define a rest position of the lever and formed from a body consisting of elastomer (7 or 7'), characterized in that at the active surface of the body which is to engage the cooperating surface, the body has a metal layer (9, 10 or 14), the thickness (a or d) of which is considerably less than the thickness (A or D) of the elastomer (7 or 7'), the metal layer being supported solely via the underlying elastomer, said damping stop means comprising the support of the metal layer solely via the underlying elastomer and the relative thinness of the metal layer providing low-noise and low-shock interception of the moving lever upon return to said rest condition while minimizing adhesion forces resisting separation of the damping stop means from the cooperating surface in spite of a long period of dwell with the damping stop means in contact with such cooperating surface.

2. An arrangement according to claim 1, wherein the elastomer (7 or 7') has a curved convex configuration for confronting the cooperating surface, and the metal layer (9, 10 or 14) being curved in conformity with the curved convex configuration of the elastomer (7 or 7') so as to have a line type of contact with the cooperating surface in the rest condition.

* * * * *